United States Patent
Nakamura et al.

(10) Patent No.: US 12,134,387 B2
(45) Date of Patent: Nov. 5, 2024

(54) VEHICLE OCCUPANT MONITORING APPARATUS

(71) Applicant: SUBARU CORPORATION, Tokyo (JP)

(72) Inventors: Ryota Nakamura, Tokyo (JP); Junpei Tokizaki, Tokyo (JP); Masayuki Marubashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 623 days.

(21) Appl. No.: 17/155,219

(22) Filed: Jan. 22, 2021

(65) Prior Publication Data

US 2021/0271910 A1 Sep. 2, 2021

(30) Foreign Application Priority Data

Feb. 28, 2020 (JP) .................................. 2020-033492

(51) Int. Cl.
*G06K 9/00* (2022.01)
*B60W 40/08* (2012.01)
(Continued)

(52) U.S. Cl.
CPC .............. *B60W 40/08* (2013.01); *G06V 10/25* (2022.01); *G06V 20/597* (2022.01); *G06V 40/10* (2022.01);
(Continued)

(58) Field of Classification Search
CPC ........ G06V 10/10; G06V 10/25; G06V 10/20; G06V 10/225; G06V 10/235; G06V 40/00;
(Continued)

(56) References Cited

U.S. PATENT DOCUMENTS

| 2008/0181456 A1* | 7/2008 | Aoki | G06F 3/017 382/104 |
| 2011/0216978 A1* | 9/2011 | Zhang | G06V 10/50 382/195 |

(Continued)

FOREIGN PATENT DOCUMENTS

| DE | 10 2014 226 553 A1 | 6/2016 |
| JP | 2014-119295 A | 6/2014 |

(Continued)

OTHER PUBLICATIONS

Kopinski, Thomas, Stefan Geisler, and Uwe Handmann. "Gesture-based human-machine interaction for assistance systems." 2015 IEEE International Conference on Information and Automation. IEEE, 2015. (Year: 2015).*

(Continued)

*Primary Examiner* — Edward F Urban
*Assistant Examiner* — Duy Tran
(74) *Attorney, Agent, or Firm* — TROUTMAN PEPPER HAMILTON SANDERS LLP

(57) ABSTRACT

A vehicle occupant monitoring apparatus includes an operation determination unit and an output unit. The operation determination unit is configured to process a captured image obtained by an imaging device configured to capture an image of an occupant in a vehicle. The operation determination unit is further configured to determine a non-contact operation provided by the occupant. The output unit is configured to output a control signal associated beforehand with the non-contact operation that is provided by the occupant and that is determined by the operation determination unit.

12 Claims, 7 Drawing Sheets

(51) Int. Cl.
*G06V 10/25* (2022.01)
*G06V 20/59* (2022.01)
*G06V 40/10* (2022.01)
*G06V 40/20* (2022.01)

(52) U.S. Cl.
CPC ......... *G06V 40/28* (2022.01); *B60W 2540/01* (2020.02); *B60W 2540/223* (2020.02)

(58) Field of Classification Search
CPC ...... G06V 40/10; G06V 40/107; G06V 40/11; G06V 40/113; G06V 40/1347; G06V 40/20; G06V 40/28; G06V 20/59; G06V 20/593; G06V 20/597; B60W 40/08; B60W 2040/0827; B60W 2040/0863; B60W 2040/0881; B60W 40/09; B60W 30/02; B60W 30/08; B60W 2540/01; B60W 2540/049; B60W 30/12; B60W 30/16; B60W 30/162; B60W 30/165; B60W 30/17; B60W 30/182; B60W 50/082; B60W 2540/223; B60W 2540/225; B60W 2540/227; B60K 28/00; B60K 28/165; G05D 1/0061; G05D 1/0088; G05D 1/021; G05D 1/0214; G05D 1/0221; G05D 1/0223
See application file for complete search history.

(56) References Cited

U.S. PATENT DOCUMENTS

| | | | |
|---|---|---|---|
| 2013/0226408 A1* | 8/2013 | Fung | G08G 1/166 701/1 |
| 2014/0152549 A1* | 6/2014 | Kim | G06F 3/017 345/156 |
| 2014/0172231 A1 | 6/2014 | Terada et al. | |
| 2015/0131857 A1* | 5/2015 | Han | G06V 20/597 382/103 |
| 2017/0129499 A1* | 5/2017 | Odate | B60W 60/0053 |
| 2019/0236385 A1 | 8/2019 | Nakamura | |
| 2019/0302895 A1 | 10/2019 | Jiang et al. | |

FOREIGN PATENT DOCUMENTS

| | | |
|---|---|---|
| JP | 2015-199383 A | 11/2015 |
| JP | 6030430 B2 | 10/2016 |
| JP | 2017-211884 A | 11/2017 |
| JP | 2018-55614 A | 4/2018 |
| JP | 2019-79097 A | 5/2019 |
| JP | 2019-131104 A | 8/2019 |

OTHER PUBLICATIONS

Notice of Reasons for Refusal issued in Japanese Patent Application No. 2020-033492 dated Oct. 3, 2023, with machine translation.

* cited by examiner

VEHICLE OCCUPANT MONITORING APPARATUS

CROSS-REFERENCE TO RELATED APPLICATIONS

The present application claims priority from Japanese Patent Application No. 2020-033492 filed on Feb. 28, 2020, the entire contents of which are hereby incorporated by reference.

BACKGROUND

The disclosure relates to a vehicle occupant monitoring apparatus.

Some of vehicles including automobiles are provided with an occupant monitoring apparatus to monitor if an occupant is looking aside or is drowsy (Japanese Unexamined Patent Application Publication No. 2019-131104). The occupant monitoring apparatus recognizes the occupant in the vehicle, and monitors if the occupant is looking aside or is drowsy, for example.

SUMMARY

An aspect of the disclosure provides a vehicle occupant monitoring apparatus including an operation determination unit and an output unit. The operation determination unit is configured to process a captured image obtained by an imaging device configured to capture an image of an occupant in a vehicle. The operation determination unit is further configured to determine a non-contact operation provided by the occupant. The output unit is configured to output a control signal associated beforehand with the non-contact operation that is provided by the occupant and that is determined by the operation determination unit.

An aspect of the disclosure provides a vehicle occupant monitoring apparatus including circuitry. The circuitry is configured to process a captured image obtained by an imaging device configured to capture an image of an occupant in a vehicle. The circuitry is further configured to determine a non-contact operation provided by the occupant. The circuitry is further configured to output a control signal associated beforehand with the determined non-contact operation provided by the occupant.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

Figure 1A:
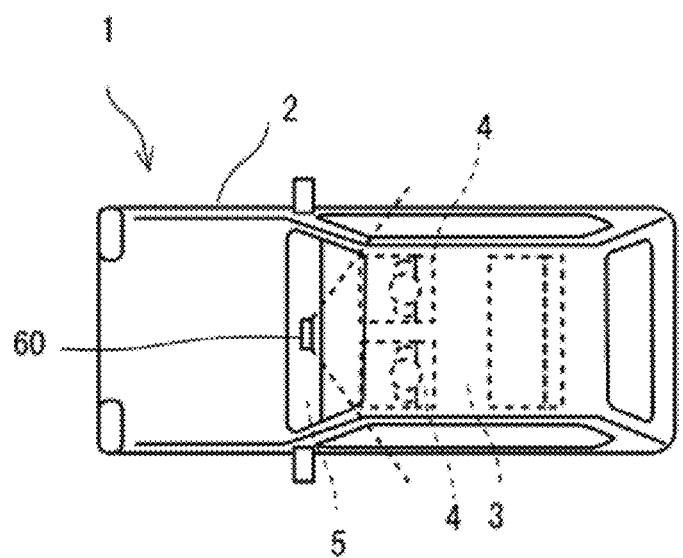
FIGS. 1A and 1B are explanatory diagrams of an occupant monitoring state in a vehicle to which an example embodiment of the disclosure is applied.

Vehicles including automobiles have been demanded potentially, for safety purposes, to improve other measures in addition to measures against such an event that an occupant is looking aside or is drowsy. For example, an occupant may operate an operation button provided in a vehicle to operate an air conditioner provided in the vehicle. It is not desired that, for such an operation as described above, the occupant concentrate attention on the operation during traveling of the vehicle. To operate the air conditioner, for example, it is desired that its operation be made easier to suppress drive operations for the vehicle from being affected.

There have been demands for vehicles that are to be driven automatically. In a vehicle in the automatic driving, an occupant is free from performing drive operations by himself or herself. The occupant may therefore be seated freely in a relaxed state, different from a driving position required for driving. Even in such a seated state, it has been desired to make it possible to operate an apparatus such as an air conditioner provided in the vehicle.

It is desirable, in the vehicle described above, to make it easier to operate an apparatus such as the air conditioner provided in the vehicle.

In the following, some embodiments of the disclosure will be described with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

Figure 1B:
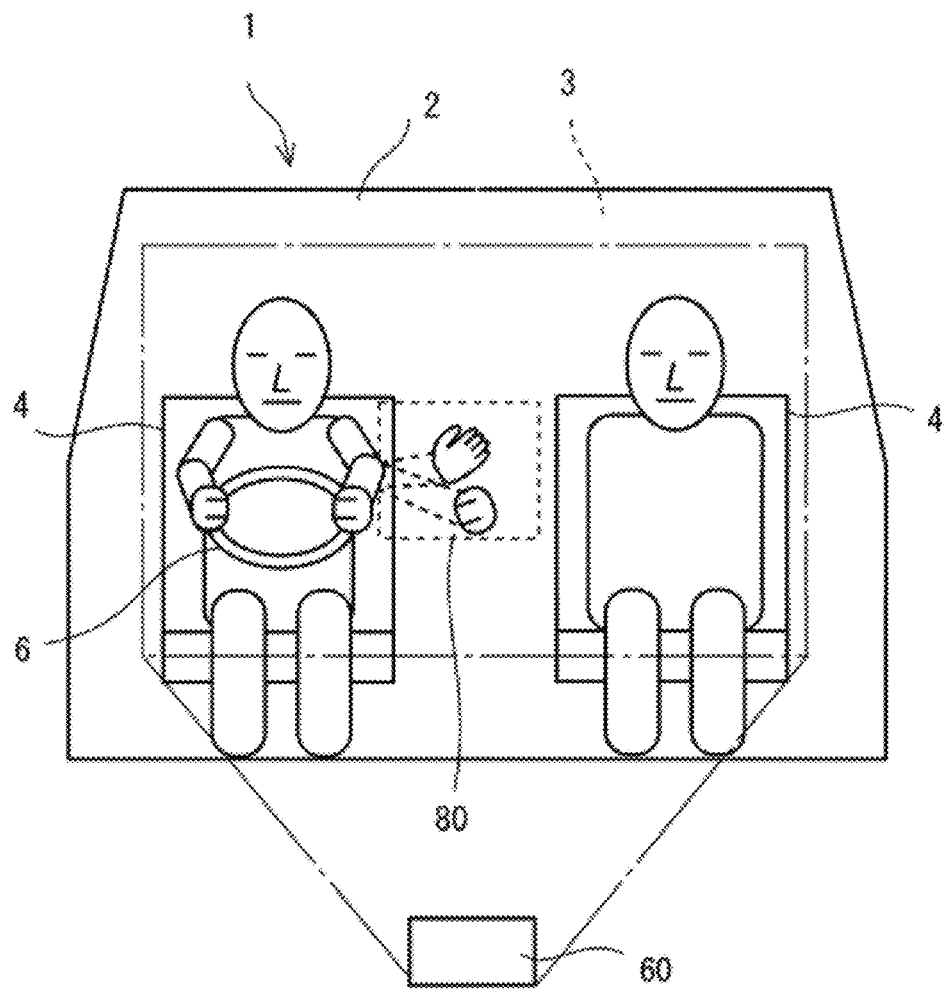

FIGS. 1A and 1B are explanatory diagrams of an occupant monitoring state in a vehicle 1 to which an example embodiment of the disclosure is applied.

FIG. 1A is a top view of the vehicle 1. FIG. 1B is a schematic explanatory diagram when a vertical cross section of a cabin 3 of the vehicle 1 is viewed from front.

The vehicle 1 may be an automobile, for example. Specific but non-limiting examples of vehicles by which a person travels may include, in addition to the vehicle 1, large vehicles, motorcycles, personal mobilities, bicycles, railroad vehicles, airplanes, and boats.

The vehicle 1 in FIGS. 1A and 1B may include a vehicle body 2, a plurality of seats 4, a dashboard 5, and a steering wheel 6, for example. The plurality of seats 4 may be provided and arranged on left and right sides in the cabin 3 of the vehicle body 2. The dashboard 5 may be provided in front of the plurality of seats 4. The steering wheel 6 may be provided to protrude rearward from the dashboard 5.

Occupants may be seated on the seats 4 provided in the cabin 3. One of the occupants may serve as a driver. The driver may be seated on one of the seats 4 at the driving position. At the driving position, the driver may hold, with both left and right hands, the steering wheel 6 provided in front of the one of the seats 4. The vehicle 1 may use driving force of a non-illustrated engine, a non-illustrated motor, or both. The vehicle 1 may follow operations of the one of the occupants to travel. In a case where a destination is set in the automatic driving, for example, the vehicle 1 may travel automatically to trace a route to the destination.

In some embodiments, the "left" may refer to the left hand side of the one of the occupants serving as the driver, and the "right" may refer to the right hand side of the one of the occupants serving as the driver.

Figure 2:
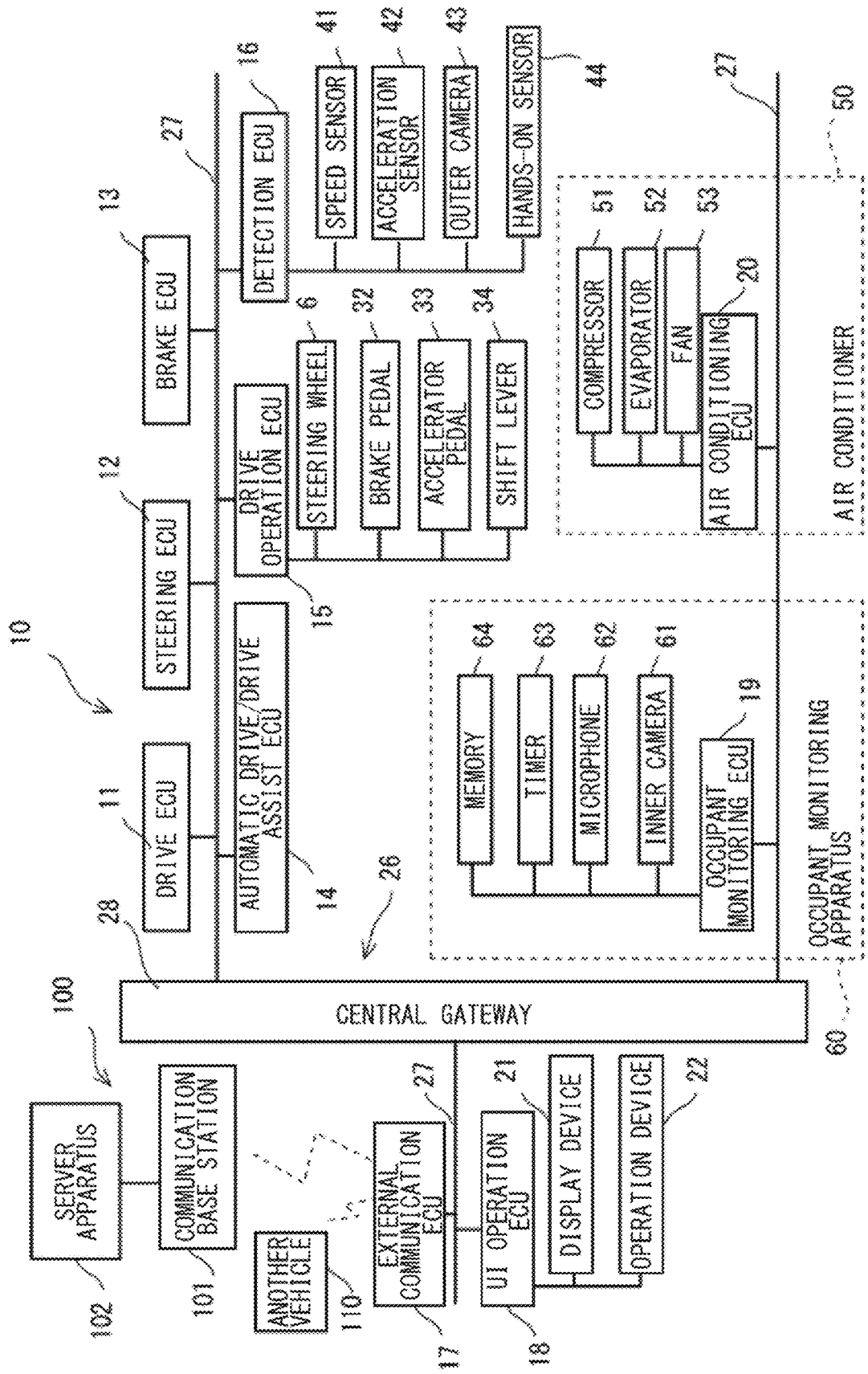
FIG. 2 is an explanatory diagram of a vehicle control system provided in the vehicle in FIGS. 1A and 1B.

FIG. 2 is an explanatory diagram of a vehicle control system 10 provided in the vehicle 1 in FIGS. 1A and 1B.

FIG. 2 illustrates, as representatives, control electronic control units (ECUs) respectively incorporated in a plurality of controllers included in the vehicle control system 10 in the vehicle 1. The controllers may respectively include, in addition to the control ECUs, for example, recording members, input and output ports, time-measuring members, and internal buses. The recording members may be configured to record control programs and data. The input and output ports may be coupled to targets to be controlled or to state detectors for the targets to be controlled. The time-measuring members may be configured to measure a time and a time period. The internal buses may be coupled to the above described components.

In a specific but non-limiting example, the control ECUs illustrated in FIG. 2 may be a drive ECU 11, a steering ECU 12, a brake ECU 13, an automatic drive/drive assist ECU 14, a drive operation ECU 15, a detection ECU 16, an external communication ECU 17, a user interface (UI) operation ECU 18, an occupant monitoring ECU 19 of an occupant monitoring apparatus 60, and an air conditioning ECU 20 of an air conditioner 50. The vehicle control system 10 in the vehicle 1 may include another non-illustrated control ECU.

The plurality of control ECUs may be coupled to a vehicle network 26 such as a controller area network (CAN) or a local interconnect network (LIN) employed in the vehicle 1. The vehicle network 26 may include a plurality of bus cables 27 and a central gateway (CGW) 28. The plurality of bus cables 27 may allow the plurality of control ECUs to be coupled to each other. The central gateway (CGW) 28 may serve as a relay to which the plurality of bus cables 27 is coupled. Identifications (IDs) may be allocated to the plurality of control ECUs. The IDs may differ from each other. The IDs may each serve as identification information. The control ECUs may each output notification data basically periodically to other control ECUs. The notification data may have an ID for one of the control ECUs and another ID for another one of the control ECUs. The one of the control ECUs may represent a source of output. The other one of the control ECUs may represent a destination of output. Each of the other control ECUs may monitor the bus cables 27. In a case where an ID that represents a destination of output corresponds to the ID of one of the control ECUs, for example, the one of the control ECUs may acquire notification data. The one of the control ECUs may then execute processing on the basis of the notification data. The central gateway 28 may monitor the plurality of bus cables 27 being coupled, respectively. In a case where one of the control ECUs is coupled to one of the bus cables 27, another one of the control ECUs is coupled to another one of the bus cables 27, the one of the control ECUs represents a source of output, and the central gateway 28 detects the other one of the control ECUs, the central gateway 28 may output notification data to the other one of the bus cables 27. Through the relay processing performed by the central gateway 28, as described above, while one of the plurality of control ECUs is coupled to one of the bus cables 27, and another one of the control ECUs is coupled to another one of the bus cables 27, exchanging of notification data to be inputted and outputted may be achieved between the one of the plurality of control ECUs and the other one of the plurality of control ECUs.

The external communication ECU 17 may communicate in a wireless manner with, for example, a communication base station 101 and a communication device that are present outside of the vehicle 1. The communication device may be provided in another vehicle 110. The communication base station 101 may be, for example, a base station belonging to an advanced driver assistance system (ADAS) communication network or a base station belonging to a carrier communication network. The base station belonging to the carrier communication network may communicate with not only the communication device provided in the other vehicle 110, but also a portable device that is possessed by a pedestrian. The external communication ECU 17 may be separated into a plurality of portions in accordance with types of counterparts. The plurality of portions may communicate directly with the counterparts, respectively. The plurality of portions may be provided in the vehicle 1. The communication base station 101, the communication device provided in the other vehicle 110, and the portable device may configure a transportation system 100, together with a server apparatus 102. The external communication ECU 17 may communicate directly in a wireless manner with the communication base station 101 or the communication device provided in the other vehicle 110. The external communication ECU 17 may thus send and receive communication data to and from the server apparatus 102, the other vehicle 110, or the portable device.

The UI operation ECU 18 may be coupled to a user interface device for the occupants. For example, the UI operation ECU 18 may be coupled to a display device 21 and an operation device 22. The display device 21 may be, for example, a liquid crystal device or an image projection device. The operation device 22 may be, for example, a touch panel or a keyboard. The display device 21 and the operation device 22 may be mounted, for example, on the dashboard 5. The UI operation ECU 18 may acquire notification data from the vehicle network 26. The UI operation ECU 18 may then cause the display device 21 to perform display on the basis of the notification data. When the operation device 22 accepts an operation entry, the UI operation ECU 18 may output the operation entry to the vehicle network 26. The UI operation ECU 18 may execute processing on the basis of the operation entry. The UI operation ECU 18 may include a result of the processing in the notification data. The UI operation ECU 18 may, for example, cause a setting screen for another apparatus such as the air conditioner 50 provided in the vehicle 1 to be displayed. The UI operation ECU 18 may then output a set value selected through an operation entry to the other apparatus via the vehicle network 26.

The drive operation ECU 15 may be coupled, for example, to operation members. The operation members may be used by the one of the occupants to control traveling of the vehicle 1. Specific but non-limiting examples of the operation members may include the steering wheel 6, a brake pedal 32, an accelerator pedal 33, and a shift lever 34.

As one of the operation members is operated, the drive operation ECU 15 may output notification data to the vehicle network 26. The notification data may include whether there is an operation and an amount of the operation. The drive operation ECU 15 may execute processing regarding the operation that is made on the one of the operation members. The drive operation ECU 15 may then include a result of the processing in the notification data.

In a case where, for example, the accelerator pedal 33 is operated in a situation where another movable body or a fixed object lies in front of the vehicle 1 in an advancing direction, the drive operation ECU 15 may determine that the operation is abnormal. The drive operation ECU 15 may then include a result of the determination in the notification data.

The detection ECU 16 may be coupled, for example, to detection members. The detection members may each detect a traveling state of the vehicle 1. Specific but non-limiting examples of the detection members may include a speed sensor 41, an acceleration sensor 42, an outer camera 43, and a hands-on sensor 44. The speed sensor 41 may be configured to detect a speed of the vehicle 1. The acceleration sensor 42 may be configured to detect a degree of acceleration of the vehicle 1. The outer camera 43 may be configured to capture an image of an outside area of the vehicle 1. In one embodiment, the outer camera 43 may be a stereo camera, for example. The hands-on sensor 44 may be configured to detect whether one or both of the hands is or are on the steering wheel 6. The detection ECU 16 may acquire detection information from each of the detection members. The detection ECU 16 may then output notification data including the detection information to the vehicle network 26. The detection ECU 16 may execute processing on the basis of the detection information. The detection ECU 16 may then include a result of the processing in the notification data. In a case where, for example, the acceleration sensor 42 detects acceleration, and a degree of the acceleration exceeds a threshold for collision detection, the detection ECU 16 may determine that a collision is detected. The detection ECU 16 may then include a result of the collision detection in the notification data. The detection ECU 16 may extract a movable body on the basis of a captured image obtained by the outer camera 43. The movable body may be a pedestrian or the other vehicle 110, for example. The movable body may be present within an area around the vehicle 1. The detection ECU 16 may determine a type and an attribute of the movable body. The detection ECU 16 may estimate a relative direction, a relative distance, and a moving direction of the movable body in accordance with a position, a size, and a change of the movable body in the image. The detection ECU 16 may include information of the movable body, including a result of the estimation, in the notification data. The detection ECU 16 may then output the notification data to the vehicle network 26.

The automatic drive/drive assist ECU 14 may acquire the notification data from the vehicle network 26. The automatic drive/drive assist ECU 14 may then switch a traveling method of the vehicle 1 between automatic driving and manual driving.

The automatic drive/drive assist ECU 14 may acquire the notification data from the vehicle network 26. The automatic drive/drive assist ECU 14 may then execute a control for automatic driving or drive-assisting of the vehicle 1. The automatic drive/drive assist ECU 14 may then generate and output travel control data to the drive ECU 11, the steering ECU 12, and the brake ECU 13. The drive ECU 11, the steering ECU 12, and the brake ECU 13 may control traveling of the vehicle 1 on the basis of the entered travel control data.

In a case where the automatic drive/drive assist ECU 14 allows the vehicle 1 to be driven in the automatic driving, the automatic drive/drive assist ECU 14 may acquire notification data from the vehicle network 26. The automatic drive/drive assist ECU 14 may then search for or acquire a route to a destination. The automatic drive/drive assist ECU 14 may further acquire notification data from the vehicle network 26. The automatic drive/drive assist ECU 14 may then determine whether an abnormal or dangerous situation arises in or around the vehicle 1. The automatic drive/drive assist ECU 14 may generate, in a case where there is no abnormal or dangerous situation in and around the vehicle 1, travel control data regarding a path along which the vehicle 1 moves in accordance with the route. The automatic drive/drive assist ECU 14 may then output the travel control data as notification data. The automatic drive/drive assist ECU 14 may control traveling of the vehicle 1 on the basis of position information of the vehicle 1. The position information may be received from a global positioning system (GPS) receiver, for example. The vehicle 1 may thus be allowed to travel along a moving route to a destination such as a parking area. In a case where an abnormal or dangerous situation arises in or around the vehicle 1, the automatic drive/drive assist ECU 14 may generate travel control data used to avoid the abnormal or dangerous situation. The automatic drive/drive assist ECU 14 may then output the travel control data as notification data.

In a case where the automatic drive/drive assist ECU 14 assists driving of the vehicle 1, the automatic drive/drive assist ECU 14 may acquire notification data regarding an operation entry from the UI operation ECU 18 via the vehicle network 26. The automatic drive/drive assist ECU 14 may adjust an operation in accordance with the operation entry to generate travel control data. The automatic drive/drive assist ECU 14 may then output the travel control data as notification data. The automatic drive/drive assist ECU 14 may control traveling of the vehicle 1 in accordance with a drive operation that is made by the one of the occupants. In a case where an abnormal or dangerous situation arises in or around the vehicle 1, the automatic drive/drive assist ECU 14 may generate travel control data used to avoid the abnormal or dangerous situation. The automatic drive/drive assist ECU 14 may then output the travel control data as notification data.

The air conditioning ECU 20 may be coupled, for example, to a compressor 51, an evaporator 52, and a fan 53. The compressor 51 may be configured to circulate a heat medium. These members may configure the air conditioner 50 provided in the vehicle 1 in FIGS. 1A and 1B. The air conditioning ECU 20 may control the members for respective operations to supply hot air or cold air to the cabin 3. The air conditioning ECU 20 may control supplying of hot air or cold air to attain a set temperature in the cabin 3.

The occupant monitoring ECU 19 may be coupled to a memory 64, a timer 63, a microphone 62, and an inner camera 61. These components may configure the occupant monitoring apparatus 60 in the vehicle 1 in FIGS. 1A and 1B.

The timer 63 may be configured to measure a time and a time period.

The microphone 62 may be configured to collect sound in the cabin 3.

The inner camera 61 may serve as an imaging device. The inner camera 61 may be configured to capture an image in the cabin 3. The inner camera 61 may be provided to face rearward on the dashboard 5 in the cabin 3, as illustrated in FIGS. 1A and 1B, for example. The inner camera 61 may capture an image of the occupants being seated on the seats 4 in the cabin 3. In a captured image obtained by the inner camera 61 in FIGS. 1A and 1B, upper bodies of the plurality of occupants being seated on the plurality of seats 4 arranged on the left and right sides may be captured.

The memory 64 may be configured to store programs and data. The occupant monitoring ECU 19 may execute the programs. The data may be used when each of the programs is executed.

When the one of the occupants rides on the vehicle 1, or a non-illustrated start button in the vehicle 1 is operated to activate the vehicle 1 into a travel ready state, the occupant monitoring ECU 19 may read and execute each of the programs from the memory 64. In response to a fact that the vehicle 1 is activated and the vehicle network 26 is ready to communicate, for example, the occupant monitoring ECU 19 may read and execute each of the programs from the memory 64. In this case, the occupant monitoring ECU 19 may normally read and execute each of the programs from the memory 64 in a case where there is the one of the occupants in the vehicle 1, regardless of whether any of the occupants is about to ride on or off the vehicle 1. The occupant monitoring ECU 19 may thus serve as a controller for the occupant monitoring apparatus 60 in the vehicle 1. The occupant monitoring ECU 19 serving as the controller of the occupant monitoring apparatus 60 may recognize and identify the occupants in the vehicle 1. The occupant monitoring ECU 19 may monitor the occupants in the vehicle 1. The occupant monitoring ECU 19 may then determine if the one of the occupants is looking aside or is drowsy, mainly on the basis of an image of a head or an image of eyes of the one of the occupants. It is therefore possible to improve travel safety of the vehicle 1.

The vehicle 1 has been further demanded potentially, for safety purposes, to improve other measures in addition to the measures against such an event that the one of the occupants is looking aside or is drowsy. For example, the one of the occupants may operate the operation device 22 provided in the vehicle 1 to set the air conditioner 50, for example, provided in the vehicle 1. In this case, the one of the occupants may concentrate attention on the operation device 22 and the display device 21. If the one of the occupants concentrates attention on such an operation, travel safety of the vehicle 1 can be affected, similar to a case where the one of the occupants is looking aside or is drowsy. To operate the air conditioner 50, for example, it is desired that its operation be made easier to suppress drive operations for the vehicle 1 from being affected.

There have been demands for the vehicle 1 that is to be driven automatically. In a case where the automatic drive/drive assist ECU 14 allows the vehicle 1 to travel in the automatic driving, the one of the occupants may be free from performing drive operations by himself or herself.

In this case, the one of the occupants may therefore be seated freely in a relaxed state, different from the driving position at which the one of the occupants is able to promptly operate the steering wheel 6, for example. In a case where the one of the occupants is seated in a state that differs from the driving position for driving, one of the hands of the one of the occupants may not reach the operation device 22 and the display device 21 provided on the dashboard 5. Even in such a state as described above, it has been desired, in the vehicle 1, to make it possible to perform settings for the air conditioner 50, for example, provided in the vehicle 1.

As described above, it is desirable, in the vehicle 1, to make it easier to operate an apparatus such as the air conditioner 50 provided in the vehicle 1.

The occupant monitoring apparatus 60 may include the inner camera 61 configured to capture an image of the whole upper bodies of the occupants in the vehicle 1.

With the vehicle 1 according to the example embodiment, for example, it is therefore possible to cause the inner camera 61 to capture an image of a sign provided through a form of a hand of the one of the occupants in the captured image to achieve a control in accordance with the hand sign. For example, in a case where a hand sign in a predetermined shape in a captured image obtained by the inner camera 61 is associated with a temperature control that is set beforehand for the air conditioner 50, it is possible to allow the inner camera 61 to capture an image of the hand sign. It is also possible to execute the temperature control for the air conditioner 50 on the basis of the hand sign captured in the image.

Making available an operation through a hand in the form of a hand sign, as described above, allows the one of the occupants to perform a non-contact operation to set or control the air conditioner 50, for example, provided in the vehicle 1. The one of the occupants may not therefore be caused to operate the operation device 22. In a case where an open hand that is referred to as a paper-shaped hand of the one of the occupants, who serves as the driver, is presented between the seats 4, as illustrated in FIG. 1B, for example, it is possible to allow the occupant monitoring ECU 19 to output, to the air conditioner 50, a control signal used to perform a setting or a control associated beforehand with the paper-shaped hand. In a case where a closed hand that is referred to as a rock-shaped hand of the one of the occupants is presented between the seats 4, for example, it is also possible to allow the occupant monitoring ECU 19 to output, to the air conditioner 50, a control signal used to perform a setting or a control associated beforehand with the rock-shaped hand. It is possible, for the air conditioner 50, for example, to perform a setting change to increase a temperature on the basis of the control signal corresponding to the paper-shaped hand or to perform a setting change to lower the temperature on the basis of the control signal corresponding to the rock-shaped hand. It is therefore possible to allow the one of the occupants to perform a non-contact operation to set or control the air conditioner 50, for example, provided in the vehicle 1.

In one embodiment, the occupant monitoring ECU 19 may serve as an "operation determination unit".

In one embodiment, the occupant monitoring ECU 19 may further serve as an "output unit".

In one embodiment, the occupant monitoring ECU 19 may still further serve as a "start determination unit".

In one embodiment, the occupant monitoring ECU 19 may still further serve as a "state determination unit".

Figure 3:
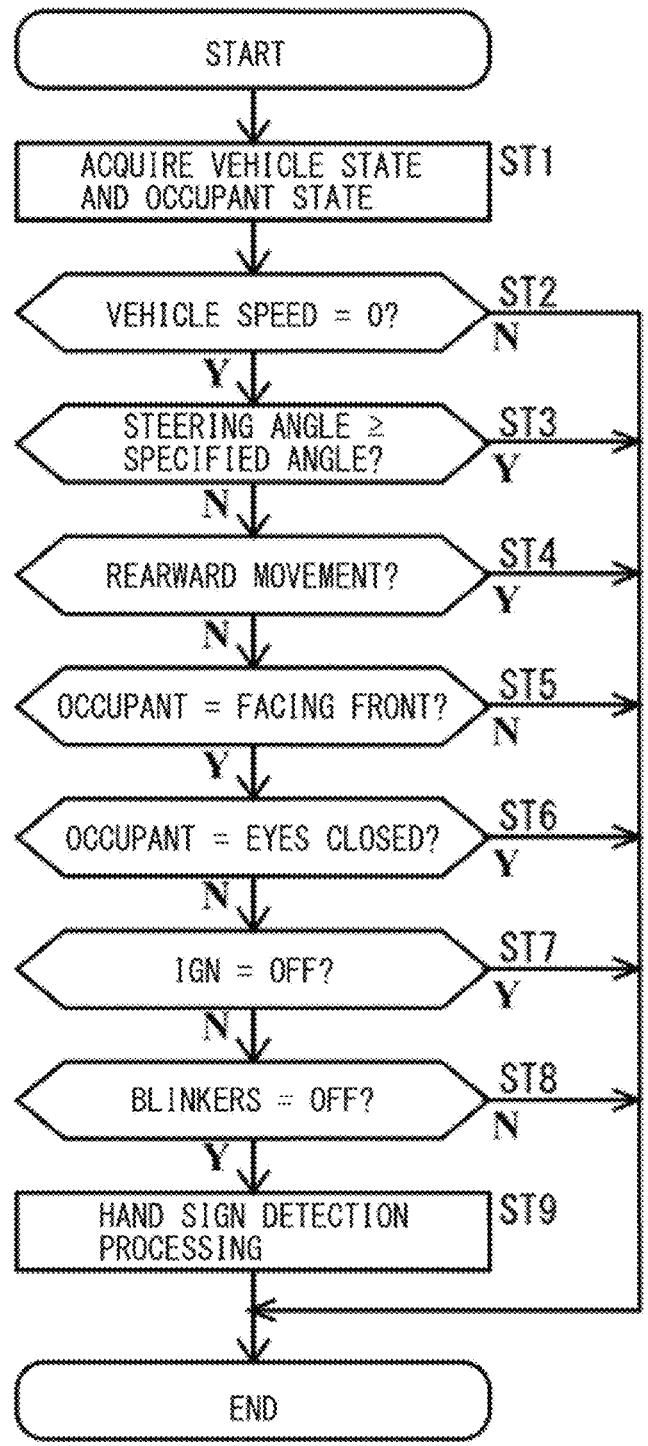
FIG. 3 is a flowchart of an example of main processing to be performed, for a non-contact operation, by an occupant monitoring ECU in FIG. 2.

FIG. 3 is a flowchart of an example of main processing for a non-contact operation. The processing is to be performed by the occupant monitoring ECU 19 in FIG. 2.

The occupant monitoring ECU 19 may detect a non-contact operation provided by the one of the occupants through a hand sign to execute repeatedly the processing in FIG. 3 to set or control the air conditioner 50, for example, provided in the vehicle 1. In a case where there is at least one of the occupants in the vehicle 1, the occupant monitoring ECU 19 may repeatedly execute the processing in FIG. 3. In the processing in FIG. 3, the occupant monitoring ECU 19 may determine whether the one of the occupants is safely providing a hand sign to perform a non-contact operation.

At step ST1, the occupant monitoring ECU 19 may collect and acquire information of a state of the vehicle 1 and information of a state of at least the one of the occupants. The occupant monitoring ECU 19 may acquire information regarding traveling of the vehicle 1 from the vehicle network 26, in addition to a captured image obtained by the inner camera 61 and determination information obtained by the occupant monitoring ECU 19 itself as to whether the one of the occupants is looking aside or is drowsy.

At step ST2, the occupant monitoring ECU 19 may determine a vehicle speed of the vehicle 1 on the basis of the information collected at step ST1. In a case where the vehicle speed is higher than 0 kilometers per hour and lower than a maximum speed of the vehicle 1, for example, the vehicle 1 may be regarded as traveling. The occupant monitoring ECU 19 may then determine that the vehicle speed is not 0 (step ST2: N). In this case, the occupant monitoring ECU 19 may end the processing. In a case where the vehicle speed is 0 (step ST2: Y), the occupant monitoring ECU 19 may allow the processing to advance to step ST3.

At step ST3, the occupant monitoring ECU 19 may determine a steering angle on the basis of the information collected at step ST1. A direction in which the vehicle 1 travels may deviate from a longitudinal direction in accordance with a steering angle at which the steering wheel 6 is steered. In a case where a magnitude of the steering angle is equal to or above a predetermined specified angle (step ST3: Y), the occupant monitoring ECU 19 may end the processing. The specified angle may be 180 degrees, for example. In a case where the magnitude of the steering angle falls within a range below the predetermined specified angle (step ST3: N), the occupant monitoring ECU 19 may allow the processing to advance to step ST4.

At step ST4, the occupant monitoring ECU 19 may determine a rearward movement of the vehicle 1 on the basis of the information collected at step ST1. In a case where the vehicle 1 moves rearward, the one of the occupants may turn back to check a scene behind the vehicle body 2. In a case where there is a possibility that the vehicle 1 moves rearward, such as a case where the shift lever is at a reverse position or the vehicle 1 is about to move rearward in the automatic driving, for example (step ST4: Y), the occupant monitoring ECU 19 may end the processing. In a case where there is no possibility that the vehicle 1 moves rearward (step ST4: N), the occupant monitoring ECU 19 may allow the processing to advance to step ST5.

At step ST5, the occupant monitoring ECU 19 may determine whether the one of the occupants faces forward, a direction of which corresponds to an advancing direction of the vehicle 1, and the one of the occupants is in a driving ready state, on the basis of the information collected at step ST1. In a case where a face of the one of the occupants is not facing forward, but the one of the occupants is looking aside, for example (step ST5: N), the occupant monitoring ECU 19 may end the processing. In a case where the face of the one of the occupants is facing forward (step ST5: Y), the occupant monitoring ECU 19 may allow the processing to advance to step ST6.

At step ST6, the occupant monitoring ECU 19 may determine whether the eyes of the one of the occupants are in the driving ready state on the basis of the information collected at step ST1. In a case where the eyes of the one of the occupants sometimes close, due to that the one of the occupants is drowsy, for example (step ST6: Y), the one of the occupants may be regarded as not being in the driving ready state. In this case, the occupant monitoring ECU 19 may end the processing. In a case where the eyes of the one of the occupants are open continuously (step ST6: N), the occupant monitoring ECU 19 may allow the processing to advance to step ST7.

At step ST7, the occupant monitoring ECU 19 may determine whether an ignition switch is in an off state on the basis of the information collected at step ST1. In a case where the ignition switch is in the off state (step ST7: Y), the air conditioner 50 may stop its operation. In a case where the ignition switch is in the off state, the occupant monitoring ECU 19 may then end the processing. In a case where the ignition switch is not in the off state, but is in an on state (step ST7: N), the occupant monitoring ECU 19 may allow the processing to advance to step ST8.

At step ST8, the occupant monitoring ECU 19 may determine whether blinkers representing turn indicator lights of the vehicle 1 are in an off state on the basis of the information collected at step ST1. In a case where the vehicle 1 is steered to make a right or left turn, or in a case where the vehicle 1 stops suddenly due to an emergency situation, the blinkers may turn into an on state to blink. In a case where the blinkers are not in the off state, but are in the on state (step ST8: N), the occupant monitoring ECU 19 may end the processing. In a case where the blinkers are in the off state (step ST8: Y), the occupant monitoring ECU 19 may allow the processing to advance to step ST9.

At step ST9, the occupant monitoring ECU 19 may execute the processing of detecting a non-contact operation provided, through a hand sign, by the one of the occupants. After that, the occupant monitoring ECU 19 may end the processing.

As described above, the occupant monitoring ECU 19 may serve as the state determination unit to determine a state of the vehicle 1 and a state of at least the one of the occupants, through the processing from step ST2 to step ST8. In a case where the states are regarded as appropriate for a non-contact operation, the occupant monitoring ECU 19 may execute the processing of detecting a non-contact operation at step ST9. The occupant monitoring ECU 19 may determine, as a state of the vehicle 1 or a state of at least the one of the occupants, all of a speed of the vehicle 1, a steering angle of the vehicle 1, a rearward movement state of the vehicle 1, a travel ready state of the vehicle 1, a lighting state of the turning lights, and a manual driving ready state of the one of the occupants. In a case where it is possible to determine that at least the one of the occupants is allowed to perform a non-contact operation, the occupant monitoring ECU 19 may execute the processing of detecting a non-contact operation at step ST9. Conditions under which the processing of detecting a non-contact operation is executable may not be limited to the conditions described above. For example, the processing at step ST8 may be omitted.

Figure 4:
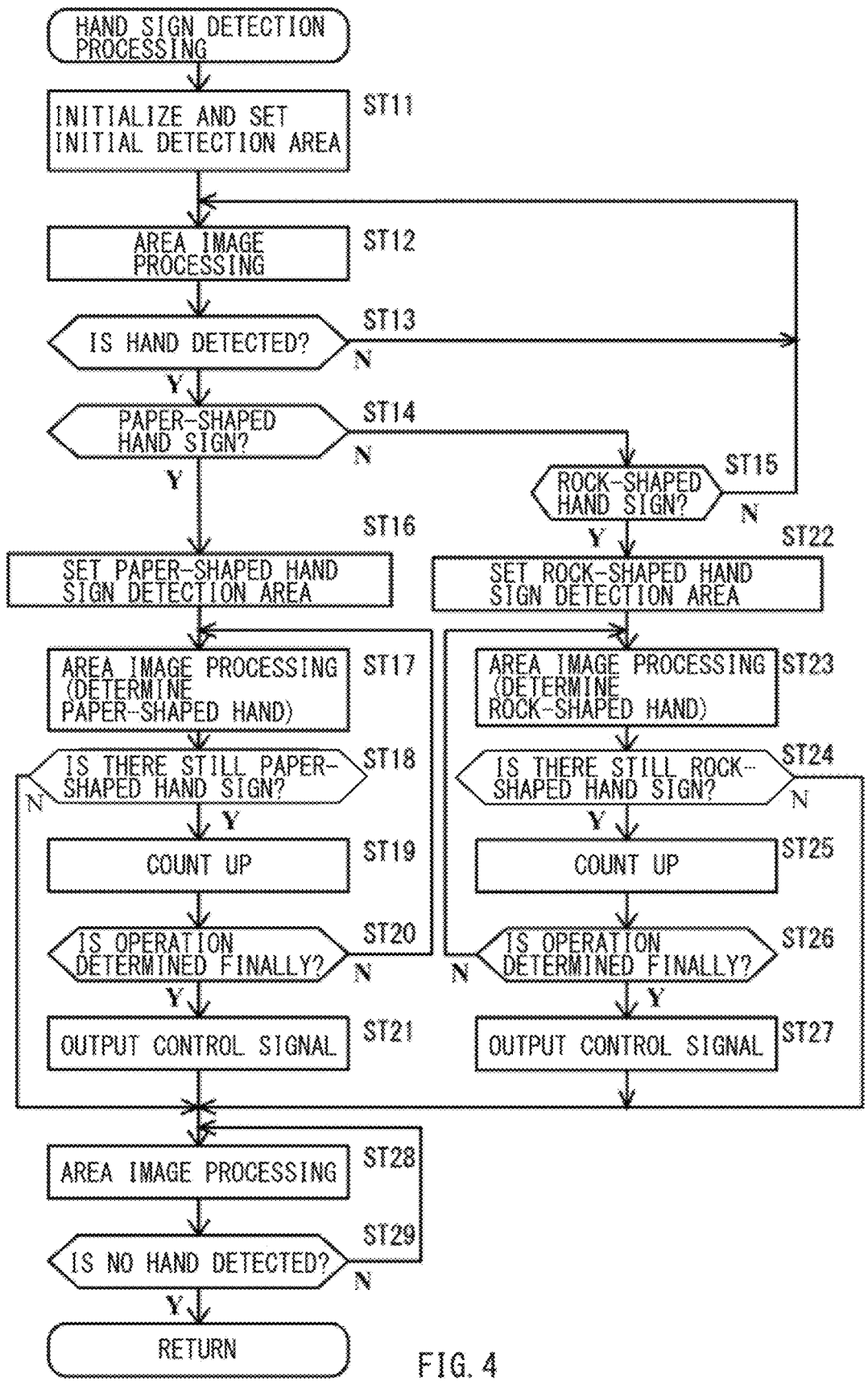
FIG. 4 is a flowchart of an example of detailed processing of hand sign detection processing at step ST9 in FIG. 3.

FIG. 4 is a flowchart of an example of detailed processing of hand sign detection processing at step ST9 in FIG. 3.

At step ST11, the occupant monitoring ECU 19 may serve as the start determination unit to execute initializing processing for the hand sign detection processing. The occupant monitoring ECU 19 may set an initial detection area 80. In one embodiment, the initial detection area 80 may serve as a "portion detection area". The initial detection area 80 may be used to determine an operation through a form of a hand of the one of the occupants. As illustrated in FIGS. 1A and 1B, for example, the initial detection area 80 may represent an area of a part of an imaging range of the inner camera 61. The area may expand within a range from which it is possible to capture in an image a form of a hand in a case where the one of the occupants serves as the driver, and the driver has released one of the hands from the steering wheel 6, and moved the one of the hands sideways. In FIGS. 1A and 1B, the driver may stretch slightly his or her left arm to allow the hand to be present within the initial detection area 80. All fingers and a thumb of the left hand may be closed (rock-shaped hand) or open (paper-shaped hand). The initial detection area 80 may be set relatively wider, making it possible to detect as soon as possible a form of an outstretched hand of the one of the occupants. Setting the initial detection area 80 relatively wider further makes it possible to keep a hand within the initial detection area 80, even if the hand moves in position as if the hand provides a motion, due to a movement of the vehicle 1 that is traveling, for example. Different from FIGS. 1A and 1B, the hand of the driver holding the steering wheel 6 may be present within the initial detection area 80. The occupant monitoring ECU 19 may reset a counter used for the processing.

At step ST12, the occupant monitoring ECU 19 may execute area image processing with respect to the initial detection area 80. The occupant monitoring ECU 19 may cut out a partial image corresponding to the initial detection area 80 from a last captured image obtained by the inner camera 61 to determine, from the partial image, a form of a hand of the one of the occupants.

At step ST13, the occupant monitoring ECU 19 may determine whether a hand of the one of the occupants is captured in the image as a predetermined portion of the one of the occupants. In a case where a form of a hand of the one of the occupants is identified (step ST13: Y), the occupant monitoring ECU 19 may allow the processing to advance to step ST14. In a case where it is not possible to identify a form of a hand of the one of the occupants (step ST13: N), the occupant monitoring ECU 19 may cause the processing to return to step ST12.

At step ST14, the occupant monitoring ECU 19 may determine whether the detected form of the hand of the one of the occupants corresponds to the paper-shaped hand. In a case where the form of the hand of the one of the occupants does not correspond to the paper-shaped hand (step ST14: N), the occupant monitoring ECU 19 may allow the processing to advance to step ST15. At step ST15, the occupant monitoring ECU 19 may determine whether the detected form of the hand of the one of the occupants corresponds to the rock-shaped hand. In a case where the form of the hand of the one of the occupants does not correspond to the rock-shaped hand (step ST15: N), the occupant monitoring ECU 19 may cause the processing to return to step ST12.

As described above, the occupant monitoring ECU 19 may serve as the start determination unit to repeat the processing from step ST12 to step ST15 to process a sequentially-updated, last captured image obtained by the inner camera 61. In a case where the paper-shaped hand sign is detected from a sequentially-updated, last captured image obtained by the inner camera 61 (step ST14: Y), the occupant monitoring ECU 19 may allow the processing to advance to step ST16. In a case where the rock-shaped hand sign is detected (step ST15: Y), the occupant monitoring ECU 19 may allow the processing to advance to step ST22. Feature values may differ greatly from each other between the form of the paper-shaped hand sign and the form of the rock-shaped hand sign. Thus, determining each of the forms of hands makes it possible to discriminate highly accurately the respective forms. In one embodiment, the paper-shaped hand sign may serve as a "first sign", and the rock-shaped hand sign may serve as a "second sign".

From step ST16 to step ST21, the occupant monitoring ECU 19 may serve as the operation determination unit to determine a non-contact operation provided through the form of the paper-shaped hand sign of the hand corresponding to the predetermined portion of the one of the occupants. The paper-shaped hand sign may be associated beforehand with a temperature setting for the air conditioner 50. The occupant monitoring ECU 19 may then execute output processing to increase the temperature setting.

At step ST16, the occupant monitoring ECU 19 may set a paper-shaped hand sign detection area used to detect the non-contact operation provided through the paper-shaped hand sign. Due to its greater size of a hand being in the state of the paper-shaped hand sign, the paper-shaped hand sign detection area may be a relatively wider area, identically to the initial detection area 80, for example. In this case, the processing at step ST16 may be omitted. In one embodiment, the paper-shaped hand sign detection area may serve as a "first operation detection area".

At step ST17, the occupant monitoring ECU 19 may execute the area image processing with respect to the paper-shaped hand sign detection area. The occupant monitoring ECU 19 may determine, within the paper-shaped hand sign detection area, the hand in the form of the paper-shaped hand sign.

At step ST18, the occupant monitoring ECU 19 may determine whether the hand in the form of the paper-shaped hand sign is detected continuously within the paper-shaped hand sign detection area through the immediately previous determination processing at step ST17. In a case where the hand in the form of the paper-shaped hand sign is detected continuously (step ST18: Y), the occupant monitoring ECU 19 may allow the processing to advance to step ST19. In a case where the hand in the form of the paper-shaped hand sign is no longer detected through the immediately previous determination (step ST18: N), the occupant monitoring ECU 19 may abort the processing of detecting a non-contact operation to be provided through the form of the paper-shaped hand sign. The occupant monitoring ECU 19 may then allow the processing to advance to step ST28.

At step ST19, the occupant monitoring ECU 19 may increment a value of the counter that counts a number of times within which it is possible to detect continuously the hand in the form of the paper-shaped hand sign.

At step ST20, the occupant monitoring ECU 19 may determine finally whether the non-contact operation is provided through the hand in the form of the paper-shaped hand sign. The occupant monitoring ECU 19 may read, from the timer 63, an elapsed time from the timing of the processing at step ST16, for example. The occupant monitoring ECU 19 may then determine finally the non-contact operation in a case where the elapsed time exceeds 500 milliseconds, for example (step ST20: Y). The elapsed time after which a final determination is to be made may not be 500 milliseconds. In this case, the occupant monitoring ECU 19 may allow the processing to advance to step ST21. In a case where the elapsed time does not exceed 500 milliseconds (step ST20: N), the occupant monitoring ECU 19 may cause the processing to return to step ST17. The occupant monitoring ECU 19 may repeat the processing from step ST17 to step ST20 until the non-contact operation provided through the paper-shaped hand sign is to be determined finally.

At step ST21, the occupant monitoring ECU 19 may output a control signal used to perform a setting or a control associated beforehand with the non-contact operation provided through the hand in the form of the paper-shaped hand sign. The occupant monitoring ECU 19 may output a control signal to the air conditioning ECU 20. In accordance with the control signal, the air conditioning ECU 20 may perform a setting to increase a set temperature, for example. The air conditioning ECU 20 may cause the air conditioner 50 to increase its temperature. The occupant monitoring ECU 19 may then allow the processing to advance to step ST28.

As described above, the occupant monitoring ECU 19 may serve as the operation determination unit to determine finally the non-contact operation provided through the paper-shaped hand sign in a case where the hand in the form of the predetermined paper-shaped hand sign is determined continuously in a plurality of continuously captured images obtained by the inner camera 61. The occupant monitoring ECU 19 may output a control signal used to perform a setting or a control associated beforehand with the non-contact operation provided through the paper-shaped hand sign.

From step ST22 to step ST27, the occupant monitoring ECU 19 may serve as the operation determination unit to determine the non-contact operation provided through the form of the rock-shaped hand sign of the hand corresponding to the predetermined portion of the one of the occupants. The rock-shaped hand sign may be associated beforehand with the temperature setting for the air conditioner 50. The occupant monitoring ECU 19 may then execute the output processing to decrease the temperature setting.

At step ST22, the occupant monitoring ECU 19 may set a rock-shaped hand sign detection area used to detect the non-contact operation provided through the rock-shaped hand sign. Due to its smaller size of a hand being in the state of the rock-shaped hand sign, the rock-shaped hand sign detection area may be a relatively narrower area that is smaller than the initial detection area 80, for example. The rock-shaped hand sign detection area may differ in size than the paper-shaped hand sign detection area. In one embodiment, the rock-shaped hand sign detection area may serve as a "second operation detection area".

At step ST23, the occupant monitoring ECU 19 may execute the area image processing with respect to the rock-shaped hand sign detection area. The occupant monitoring ECU 19 may determine, within the rock-shaped hand sign detection area, the hand in the form of the rock-shaped hand sign.

At step ST24, the occupant monitoring ECU 19 may determine whether the hand in the form of the rock-shaped hand sign is detected continuously within the rock-shaped hand sign detection area through the immediately previous determination processing at step ST23. In a case where the hand in the form of the rock-shaped hand sign is detected continuously (step ST24: Y), the occupant monitoring ECU 19 may allow the processing to advance to step ST25. In a case where the hand in the form of the rock-shaped hand sign is no longer detected through the immediately previous determination (step ST24: N), the occupant monitoring ECU 19 may abort the processing of detecting a non-contact operation to be provided through the form of the rock-shaped hand sign. The occupant monitoring ECU 19 may then allow the processing to advance to step ST28.

At step ST25, the occupant monitoring ECU 19 may increment a value of the counter that counts a number of times within which it is possible to detect continuously a hand in the form of the rock-shaped hand sign.

At step ST26, the occupant monitoring ECU 19 may determine finally whether the non-contact operation is provided through the hand in the form of the rock-shaped hand sign. The occupant monitoring ECU 19 may read, from the timer 63, an elapsed time from the timing of the processing at step ST22, for example. The occupant monitoring ECU 19 may then determine finally the non-contact operation in a case where the elapsed time exceeds 500 milliseconds, for example (step ST26: Y). The elapsed time after which a final determination is to be made may not be 500 milliseconds. In this case, the occupant monitoring ECU 19 may allow the processing to advance to step ST27. In a case where the elapsed time does not exceed 500 milliseconds (step ST26: N), the occupant monitoring ECU 19 may cause the processing to return to step ST23. The occupant monitoring ECU 19 may repeat the processing from step ST23 to step ST26 until the non-contact operation provided through the rock-shaped hand sign is to be determined finally.

At step ST27, the occupant monitoring ECU 19 may output a control signal used to perform a setting or a control associated beforehand with the non-contact operation provided through the hand in the form of the rock-shaped hand sign. The occupant monitoring ECU 19 may output a control signal to the air conditioning ECU 20. In accordance with the control signal, the air conditioning ECU 20 may perform a setting to decrease the set temperature, for example. The air conditioning ECU 20 may cause the air conditioner 50 to lower its temperature. The occupant monitoring ECU 19 may then allow the processing to advance to step ST28.

As described above, the occupant monitoring ECU 19 may serve as the operation determination unit to determine finally the non-contact operation provided through the rock-shaped hand sign in a case where the hand in the form of the predetermined rock-shaped hand sign is determined continuously in a plurality of continuously captured images obtained by the inner camera 61. The occupant monitoring ECU 19 may output a control signal used to perform a setting or a control associated beforehand with the non-contact operation provided through the rock-shaped hand sign.

The processing from step ST28 to step ST29 may represent post processing to be performed in a case where the control based on a determination of a form of a hand ends successfully or is aborted.

At step ST28, the occupant monitoring ECU 19 may execute the area image processing with respect to the sign detection area that is set already. The occupant monitoring ECU 19 may cut out a partial image corresponding to the initial detection area 80 from a last captured image obtained by the inner camera 61 to determine, from the partial image, a form of a hand of the one of the occupants.

At step ST29, the occupant monitoring ECU 19 may determine whether a hand of the one of the occupants is captured in an image as a predetermined portion of the one of the occupants. In a case where a form of a hand of the one of the occupants is identified (step ST29: N), the occupant monitoring ECU 19 may cause the processing to return to step ST28. The occupant monitoring ECU 19 may repeat the processing from step ST28 to step ST29. In a case where it is not possible to identify a form of a hand of the one of the occupants (step ST29: Y), the occupant monitoring ECU 19 may end the processing. The occupant monitoring ECU 19 may cause the processing to return to the processing in FIG. 3 to end the processing for a non-contact operation.

Checking that it is not possible to identify a form of a hand of the one of the occupants, as described above, may prevent the occupant monitoring ECU 19 from executing continuously the processing in FIGS. 3 and 4 for a next time, even if the one of the occupants intends to perform the operation continuously. The one of the occupants may not be able to perform the operation continuously. The occupant monitoring ECU 19 may repeat the processing in FIGS. 3 and 4 after the occupant monitoring ECU 19 determines no hand. The occupant monitoring ECU 19 may serve as the operation determination unit to determine a next non-contact operation to be provided by the one of the occupants after the hand shape is no longer detected after the final determination.

Figure 5A:
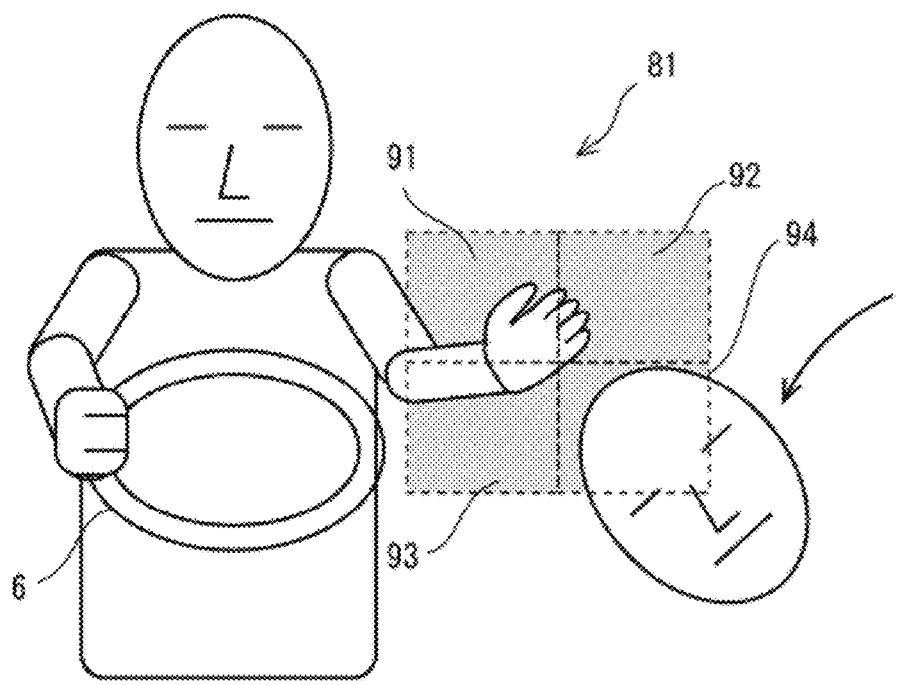
FIGS. 5A and 5B are explanatory diagrams of a paper-shaped hand sign detection area and a rock-shaped hand sign detection area according to the example embodiment.
Figure 5B:
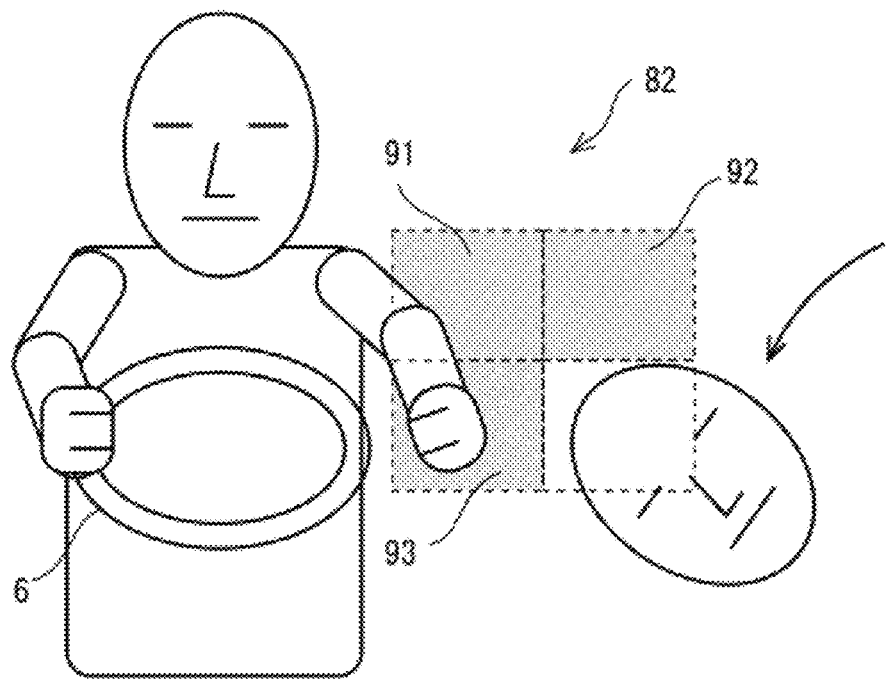

FIGS. 5A and 5B are explanatory diagrams of the paper-shaped hand sign detection area and the rock-shaped hand sign detection area according to the example embodiment.

As illustrated in hatched frames in FIG. 5A, a paper-shaped hand sign detection area 81 may be set within a rectangular area extending leftward from a left-side portion of the steering wheel 6.

As illustrated in hatched frames in FIG. 5B, the paper-shaped hand sign detection area 81 having the rectangular area may be divided into four parts. A rock-shaped hand sign detection area 82 may be set within an area having a shape acquired by excluding a lower-left part, from the four divided, paper-shaped hand sign detection area 81 having the rectangular area.

In this case, the rock-shaped hand sign detection area 82 may be smaller in area than the paper-shaped hand sign detection area 81 by an area of the lower-left part.

Setting the different areas as the paper-shaped hand sign detection area 81 and the rock-shaped hand sign detection area 82, as described above, makes it possible to determine successfully, within the wider area, the paper-shaped hand sign that is greater in area than the rock-shaped hand sign.

In a case where a head of another one of the occupants being seated on a front passenger's seat representing another one of the seats 4 moves sideways toward a center of the vehicle body 2, due to rolling of the vehicle body 2, the head may enter the area of the lower-left part of the paper-shaped hand sign detection area 81 having the wider rectangular area. The head may thus be captured in an image. In a case where the other one of the occupants is seated, and the head of the other one of the occupants moves sideways, as described above, the head may be determined, within the sign detection area, as a round outline that is similar to the rock-shaped hand sign. In a case where the other one of the occupants is seated, the head of the other one of the occupants may move sideways, and the head may then enter the area of the lower-left part that is present next to the front passenger's seat, as described above. The area of the lower-left part may thus be excluded from the rock-shaped hand sign detection area 82. It is therefore possible to prevent the head of the other one of the occupants, as described above, from being determined erroneously as the rock-shaped hand sign.

Setting the different sign detection areas respectively for the paper-shaped hand sign and the rock-shaped hand sign makes it possible to improve accuracy in respective determinations.

The rock-shaped hand sign detection area 82 may be wholly made smaller in area than the paper-shaped hand sign detection area 81.

Figure 6:
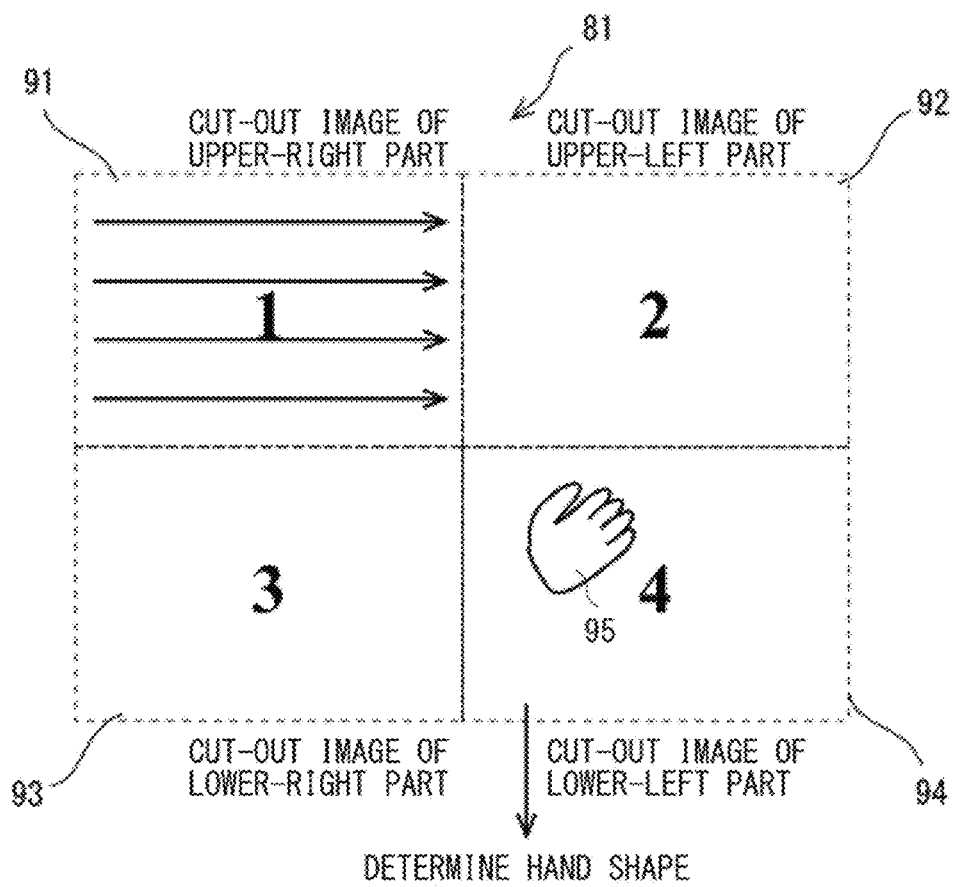
FIG. 6 is an explanatory diagram of an example of shape determination processing for a hand sign.

FIG. 6 is an explanatory diagram of an example of shape determination processing for a hand sign.

The paper-shaped hand sign detection area 81 having the rectangular area, illustrated in FIG. 6, may be divided into the four parts. The four parts may include an upper-right part, an upper-left part, a lower-right part, and the lower-left part. The upper-right part may be referred to as a cut-out image 91. The upper-left part may be referred to as a cut-out image 92. The lower-right part may be referred to as a cut-out image 93. The lower-left part may be referred to as a cut-out image 94.

In a case where the paper-shaped hand sign detection area 81 and the rock-shaped hand sign detection area 82 are set different from each other, as illustrated in FIGS. 5A and 5B, the occupant monitoring ECU 19 may perform processing as illustrated in FIG. 6, for example, to determine a form of a hand corresponding to each of the areas.

The occupant monitoring ECU 19 may first differentiate each of the upper-right part that is referred to as the cut-out image 91, the upper-left part that is referred to as the cut-out image 92, the lower-right part that is referred to as the cut-out image 93, and the lower-left part that is referred to as the cut-out image 94. As illustrated in FIG. 6, a differentiated image of the upper-right part, a differentiated image of the upper-left part, a differentiated image of the lower-right part, and a differentiated image of the lower-left part may thus be acquired. The differentiated images may each include edge components corresponding to an outline form of a hand.

Next, the occupant monitoring ECU 19 may scan sequentially the differentiated image of the upper-right part, the differentiated image of the upper-left part, the differentiated image of the lower-right part, and the differentiated image of the lower-left part, to determine an outline form of a hand in the form of the predetermined rock-shaped hand or the predetermined paper-shaped hand. The differentiated image of the lower-left part in FIG. 6 may include an outline form 95 of a hand in the form of the paper-shaped hand sign. In this case, the occupant monitoring ECU 19 may allow the lower-left part that is referred to as the cut-out image 94 to undergo processing at step ST17. It is therefore possible to determine the outline form 95 of the hand in the form of the paper-shaped hand sign.

In the processing described in here, the occupant monitoring ECU 19 may determine a form of a hand in the form of a hand sign, through a histogram-of-oriented-gradient (HOG) process. The occupant monitoring ECU 19 may use another type of image processing, such as a determination method based on deep learning using artificial intelligence (AI), for example, to determine whether there is a hand and, if any, a shape of the hand.

In determining an outline form of a hand in the form of the paper-shaped hand at step ST17, the occupant monitoring ECU 19 may repeat the processing, as described above, on all the cut-out images of the upper-right part that is referred to as the cut-out image 91, the upper-left part that is referred to as the cut-out image 92, the lower-right part that is referred to as the cut-out image 93, and the lower-left part that is referred to as the cut-out image 94. In determining an outline form of a hand in the form of the rock-shaped hand at step ST23, the occupant monitoring ECU 19 may repeat the processing, as described above, only on the upper-right part that is referred to as the cut-out image 91, the upper-left part that is referred to as the cut-out image 92, and the lower-right part that is referred to as the cut-out image 93.

In the example embodiment, as described above, a captured image obtained by the inner camera 61 configured to capture an image of an occupant in the vehicle 1 is processed to determine a non-contact operation provided by the occupant. Upon a determination of a non-contact operation provided by the occupant, a control signal associated beforehand with the non-contact operation provided by the occupant is output. The occupant is not therefore caused to focus on an operation member for operation, unlike the existing technique. The occupant is however allowed to operate in a non-contact manner various kinds of apparatuses provided in the vehicle 1.

In the example embodiment, a non-contact operation provided by an occupant may be determined finally in a case where a predetermined hand shape is determined continuously in a plurality of captured images obtained by the inner camera 61. It is therefore possible to determine accurately a state of a hand sign, where a hand of an occupant is kept in a predetermined state. Even if a hand moves momentarily, it is possible to prevent the movement of the hand from being determined as a hand sign. In determining a movement of a hand itself, specifying an ordinary-possible movement as a determination target can lead to a high possibility of erroneous determinations. To avoid such erroneous determinations, it is necessary that a special movement that is not seen in ordinary cases be specified as a determination target. Providing such a special movement as described above for each operation may be burdensome for an occupant operating or managing the vehicle 1.

In the example embodiment, a captured image obtained by the inner camera 61 may not be processed as is, but a non-contact operation provided by an occupant may be determined, with respect to an operation detection area serving as a part of the imaging range. It is therefore possible to achieve a reduction in burden of processing that continues until a result of determination is acquired for a non-contact operation provided by an occupant, compared with a case where a captured image obtained by the inner camera 61 is processed as is. In the example embodiment, for example, when an occupant is opening a hand in a non-contact manner within the paper-shaped hand sign detection area 81, the form may be determined as the paper-shaped hand sign. When the occupant is closing a hand in a non-contact manner within the rock-shaped hand sign detection area 82, the form may be determined as the rock-shaped hand sign. The paper-shaped hand sign detection area 81 and the rock-shaped hand sign detection area 82 may be made different from each other in area. As a result, a difference simply may increase in feature value of a hand that is a subject of determination, between the paper-shaped hand and the rock-shaped hand. It is also possible to determine a hand that is a subject of determination from each of the appropriate detection areas, in accordance with a state of the hand. In a specific but non-limiting example, making the rock-shaped hand sign detection area 82 used to determine the rock-shaped hand sign smaller in area than the paper-shaped hand sign detection area 81 used to determine the paper-shaped hand sign makes it possible to suppress, even if a head of another occupant being seated enters the paper-shaped hand sign detection area 81 used to determine the paper-shaped hand sign, the head from being determined erroneously as the rock-shaped hand sign. It is also possible to determine appropriately the paper-shaped hand sign within a wider area.

Making operations possible through such hand signs as described above further allows an occupant in a seated state at the driving position with a hand being presented to operate an apparatus such as the air conditioner 50 provided in the vehicle 1. The occupant is therefore not forced to concentrate attention on an operation of an apparatus such as the air conditioner 50 provided in the vehicle 1, but is able to provide easily an operation with the hand being presented, making it possible to easily operate an apparatus such as the air conditioner 50 provided in the vehicle 1. With such an easy operation that does not affect drive operations of the vehicle 1, it is possible to operate an apparatus such as the air conditioner 50 provided in the vehicle 1. With the example embodiment, it is possible to utilize the operation of the inner camera 61 of the occupant monitoring apparatus 60, allowing occupants to use apparatuses with improved convenience.

In the example embodiment, a non-contact operation provided by an occupant may not be directly determined. The initial detection area 80 may however be set. The initial detection area 80 may serve as a part of the imaging range of the inner camera 61. That is, the initial detection area 80 may represent an area from which a predetermined portion of the occupant is likely to be captured in an image. It may be determined beforehand whether a predetermined portion of the occupant is captured in an image corresponding to the initial detection area 80. In a case where it is determined that a predetermined portion is captured in the image corresponding to the initial detection area 80, a non-contact operation provided by the occupant may be determined. It is therefore not necessary to always monitor whether there is a non-contact operation provided through one of a plurality of types of hand signs. In a case where a predetermined portion of an occupant is captured in an image, it is also possible to determine, on the basis of the captured image, a non-contact operation provided through one of the plurality of types of hand signs. In this case, it is possible to determine only the non-contact operation provided through the determined certain type of the hand sign.

As described above, the example embodiment makes it possible to discriminate from each other and determine respectively at a higher degree of certainty a plurality of types of signs each provided through a predetermined portion, such as a hand, of an occupant. The example embodiment thus makes it possible to increase a rate of accuracy regarding determination of a sign to suppress erroneous determinations.

In the example embodiment, a state of the vehicle 1 or a state of an occupant may be determined beforehand to determine a non-contact operation to be provided by the occupant. Specific but non-limiting examples to be determined include a speed of the vehicle 1, a steering angle of the vehicle 1, a rearward movement state of the vehicle 1, a travel ready state of the vehicle 1, a lighting state of the turning lights, and a manual driving ready state of an occupant. In a case where the determined state is such a state that the occupant is allowed to provide a non-contact operation, a non-contact operation provided by the occupant may be determined. It is therefore possible to determine a non-contact operation provided by the occupant while securing travel safety of the vehicle 1, for example.

In a case where the start processing described above is not performed, and a non-contact operation provided by an occupant is to be always determined to determine appropriately an actual non-contact operation at a higher degree of certainty and sensitivity, in contrast, a non-contact operation can be determined erroneously even at a timing at which an occupant does not intend to provide actually a non-contact operation. In the example embodiment, exclusion conditions may be set. Under the exclusion conditions, an unintentional non-contact operation as described above may not be determined. This makes it possible to achieve both convenience and safety.

In the example embodiment, after it is determined that a hand shape is no longer detected, upon the final determination of a non-contact operation provided by an occupant, the processing may end. With this feature, an occupant may refrain from providing continuously such an easy-to-perform, non-contact operation. Even though a non-contact operation is easy to perform, providing continuously such a non-contact operation tends to cause an occupant to concentrate attention to the non-contact operation. It is thus possible to suppress such an event as described above from occurring.

Although some example embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

In the example embodiment described above, as illustrated in FIGS. 5A and 5B, for example, the paper-shaped hand sign detection area 81 and the rock-shaped hand sign detection area 82 may both be set to extend leftward from the left-side portion of the steering wheel 6.

For example, the paper-shaped hand sign detection area 81 and the rock-shaped hand sign detection area 82 may both be set to include partially the left-side portion of the steering wheel 6.

Figure 7A:
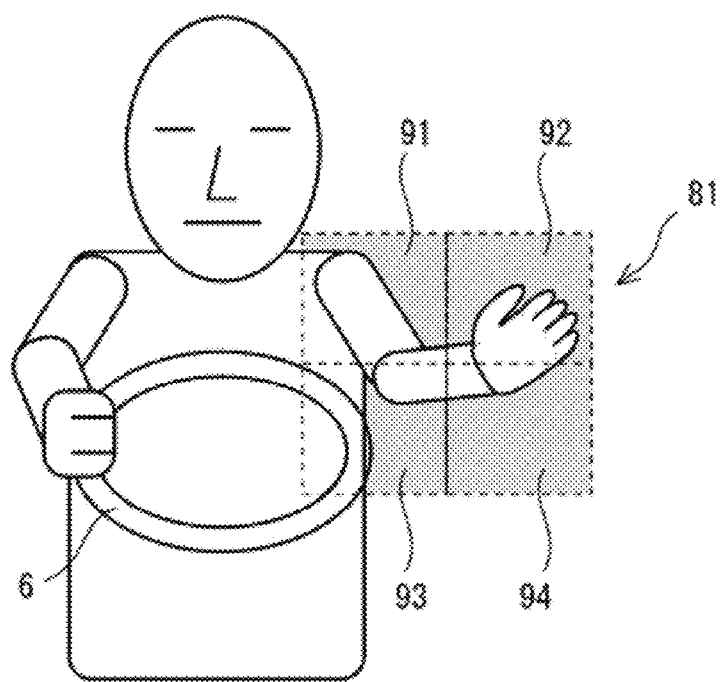
FIGS. 7A and 7B are explanatory diagrams of a paper-shaped hand sign detection area and a rock-shaped hand sign detection area according to a modification example of the example embodiment.
Figure 7B:
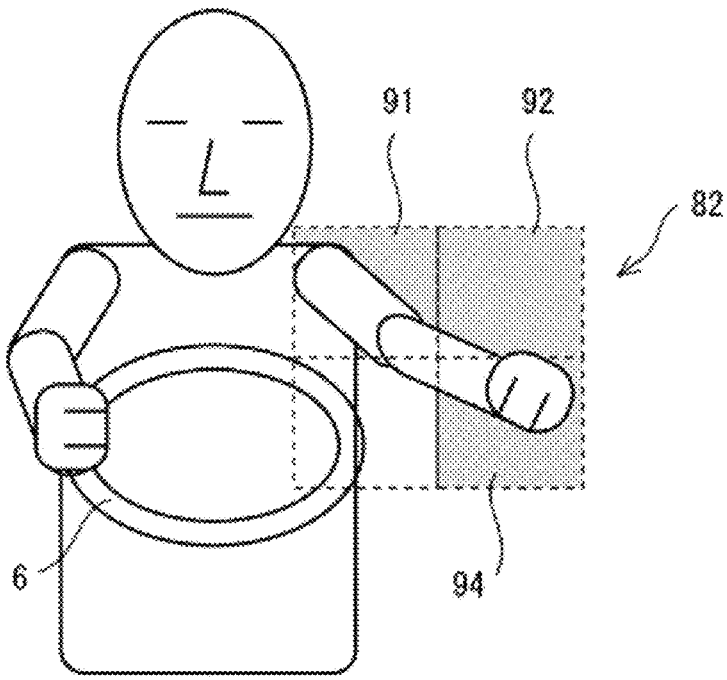

FIGS. 7A and 7B are explanatory diagrams of the paper-shaped hand sign detection area 81 and the rock-shaped hand sign detection area 82 according to a modification example of the example embodiment.

As illustrated in hatched frames in FIG. 7A, the paper-shaped hand sign detection area 81 may be set to include partially the left-side portion of the steering wheel 6.

In this case, the rock-shaped hand sign detection area 82 may be set, as illustrated in hatched frames in FIG. 7B, within an area having a shape acquired by excluding the lower-right part that is referred to as the cut-out image 93, from the paper-shaped hand sign detection area 81 having the rectangular area. The rock-shaped hand sign detection area 82 may be set within an area acquired by excluding an area from which a hand of an occupant operating the steering wheel 6 serving as an operation member is to be possibly captured in an image.

It is therefore possible to prevent the occupant monitoring ECU 19 from determining erroneously the left hand operating the steering wheel 6 serving as the operation member as a hand in the form of the rock-shaped hand sign. In a case where the rock-shaped hand sign detection area 82 used to determine the rock-shaped hand sign is set to an area acquired by excluding the area from which a hand of an occupant operating an operation member such as the steering wheel 6 is to be possibly captured in an image, from the paper-shaped hand sign detection area 81 used to determine the paper-shaped hand sign, it is possible to prevent a hand of an occupant operating an operation member such as the steering wheel 6 from being determined erroneously as the rock-shaped hand sign.

Furthermore, the paper-shaped hand sign detection area 81 and the rock-shaped hand sign detection area 82 in FIGS. 7A and 7B may be reduced in left-and-right width, respectively, from the paper-shaped hand sign detection area 81 and the rock-shaped hand sign detection area 82 in FIGS. 5A and 5B. Even if the other one of the occupants is seated on the front passenger's seat representing the one of the seats 4, and the head of the other one of the occupants moves sideways toward the center of the vehicle body 2 due to rolling of the vehicle body 2, the head would be in this case less likely to enter the area of the lower-left part of the rock-shaped hand sign detection area 82. The head would thus be less likely to be captured in an image.

The occupant monitoring ECU 19 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the occupant monitoring ECU 19. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the occupant monitoring ECU 19 illustrated in FIG. 2.

The invention claimed is:

1. A vehicle occupant monitoring apparatus comprising:
one or more processors; and
one or more memories storing instructions causing the one or more processors to:
set an initial operation detection area serving as an imaging range of an imaging device configured to capture an image of an occupant in a vehicle;
process a captured image obtained by the imaging device, to determine a form of a non-contact operation intentionally provided by a hand of the occupant, wherein the form of the non-contact operation being a first sign or a second sign, wherein the first sign indicative of a state where the hand of the occupant is open and the second sign indicative of a state where the hand of the occupant is closed, wherein the non-contact operation is associated beforehand with a control of a device in the vehicle;
in response to the non-contact operation is determined to be the first sign, set a first operation detection area to determine a first non-contact operation, wherein the first operation detection area is a rectangular area having corners;
in response to the non-contact operation is determined to be the second sign, set a second operation detection area to determine a second non-contact operation, wherein the second operation detection area is different from the first operation detection area, wherein a shape of the second operation detection area is identical to a shape of a remaining area of the rectangular area excluding a rectangular part having only a lower corner of the corners from the rectangular area, the remaining area including other corners than the lower corner of the corners, and wherein the lower corner is closer to a first seat for another occupant of the vehicle adjacent to a second seat for the occupant of the vehicle than another lower corner of the corners;
determine the non-contact operation is one of (i) the first non-contact operation intentionally provided by the hand of the occupant within the set first operation detection area or (ii) the second non-contact operation intentionally provided by the hand of the occupant within the second operation detection area; and
output a control signal associated beforehand with the non-contact operation intentionally provided by the hand of the occupant to perform the control of the device in the vehicle.

2. The vehicle occupant monitoring apparatus according to claim 1, wherein the excluded rectangular part is an area into which a head of another occupant being seated is able to enter.

3. The vehicle occupant monitoring apparatus according to claim 1, wherein the excluded rectangular part is an area from which the hand of the occupant operating an operation member is to be possibly captured in an image.

4. The vehicle occupant monitoring apparatus according to claim 1, wherein the one or more processors are configured to determine finally the non-contact operation intentionally provided by the hand of the occupant in a case where a predetermined hand shape is determined continuously in a plurality of captured images obtained by the imaging device.

5. The vehicle occupant monitoring apparatus according to claim 1, wherein the one or more processors are further configured to:
  determine whether a predetermined portion of the occupant is captured in an image corresponding to the initial operation detection area, the initial operation detection area representing an area from which the predetermined portion of the occupant is likely to be captured in an image,
  wherein the one or more processors are configured to determine, in response to the predetermined portion is captured in the image corresponding to the initial operation detection area, the non-contact operation intentionally provided by the hand of the occupant through the predetermined portion.

6. The vehicle occupant monitoring apparatus according to claim 1, wherein the one or more processors are further configured to:
  determine, as a state of the vehicle or a state of the occupant, at least one of a speed of the vehicle, a steering angle of the vehicle, a rearward movement state of the vehicle, a travel ready state of the vehicle, a lighting state of a turning light, or a manual driving ready state of the occupant,
  wherein the one or more processors are configured to determine, in response to the occupant is allowed to perform the non-contact operation, a non-contact operation intentionally provided by the hand of the occupant.

7. The vehicle occupant monitoring apparatus according to claim 1, wherein
  the one or more processors are configured to determine finally the non-contact operation intentionally provided by the hand of the occupant in response to a hand shape forming the first or the second sign is determined continuously in a plurality of captured images obtained by the imaging device, and
  the one or more processors are configured to output, upon the final determination, a control signal associated beforehand with the continuously determined hand shape forming the predetermined sign.

8. The vehicle occupant monitoring apparatus according to claim 7, wherein the one or more processors are configured to determine a next non-contact operation to be provided intentionally by the hand of the occupant after the hand shape is no longer detected after the final determination.

9. The vehicle occupant monitoring apparatus according to claim 1, wherein a contour of the second operation detection area is a non-rectangular shape.

10. The vehicle occupant monitoring apparatus according to claim 1, wherein
  the first operation detection area is defined by multiple parts including four rectangular parts having each of the corners respectively,
  the second operation detection area includes three rectangular parts corresponding to other parts of the four rectangular parts than the lower-corner part and excluding the lower-corner part.

11. A vehicle occupant monitoring apparatus comprising circuitry configured to:
  set an initial operation detection area serving as an imaging range of an imaging device configured to capture an image of an occupant in a vehicle;
  process a captured image obtained by the imaging device, to determine a form of a non-contact operation intentionally provided by a hand of the occupant, wherein the form of the non-contact operation being a first sign or a second sign, wherein the first sign indicative of a state where the hand of the occupant is open and the second sign indicative of a state where the hand of the occupant is closed, wherein the non-contact operation is associated beforehand with a control of a device in the vehicle;
  in response to the non-contact operation is determined to be the first sign, set a first operation detection area to determine a first non-contact operation, wherein the first operation detection area is a rectangular area having corners;
  in response to the non-contact operation is determined to be the second sign, set a second operation detection area to determine a second non-contact operation, wherein the second operation detection area is different from the first operation detection area, wherein a shape of the second operation detection area is identical to a shape of a remaining area of the rectangular area excluding a rectangular part having only a lower corner of the corners from the rectangular area, the remaining area including other corners than the lower corner of the corners, and wherein the lower corner is closer to a first seat for another occupant of the vehicle adjacent to a second seat for the occupant of the vehicle than another lower corner of the corners;
  determine the non-contact operation is one of (i) the first non-contact operation intentionally provided by the hand of the occupant within the set first operation detection area or (ii) the second non-contact operation intentionally provided by the hand of the occupant within the second operation detection area; and
  output a control signal associated beforehand with the determined non-contact operation intentionally provided by the hand of the occupant to perform the control of the device in the vehicle.

12. The vehicle occupant monitoring apparatus according to claim 11, wherein
  the first operation detection area is defined by multiple parts including four rectangular parts having each of the corners respectively,
  the second operation detection area includes three rectangular parts corresponding to other parts of the four rectangular parts than the lower-corner part and excluding the lower-corner part.

* * * * *